US008144223B2

(12) United States Patent
Van Blerkom et al.

(10) Patent No.: US 8,144,223 B2
(45) Date of Patent: Mar. 27, 2012

(54) IMAGING DEVICE

(75) Inventors: Daniel Van Blerkom, Altadena, CA (US); Jon H Bechtel, Holland, MI (US); Jeremy C Andrus, Zeeland, MI (US)

(73) Assignee: Gentex Corporation, Zeeland, MI (US)

( * ) Notice: Subject to any disclaimer, the term of this patent is extended or adjusted under 35 U.S.C. 154(b) by 518 days.

(21) Appl. No.: 12/361,025

(22) Filed: Jan. 28, 2009

(65) Prior Publication Data

US 2010/0188540 A1    Jul. 29, 2010

(51) Int. Cl.
*H04N 3/14* (2006.01)

(52) U.S. Cl. ........................................................ 348/299

(58) Field of Classification Search .................. 348/296, 348/297, 299
See application file for complete search history.

(56) References Cited

U.S. PATENT DOCUMENTS

| | | | |
|---|---|---|---|
| 5,748,303 A | 5/1998 | Davis et al. | |
| 5,892,541 A | 4/1999 | Merrill | |
| 6,175,383 B1 | 1/2001 | Yadid-Pecht et al. | |
| 6,765,619 B1 | 7/2004 | Deng et al. | |
| 6,831,689 B2 | 12/2004 | Yadid-Pecht | |
| 6,963,369 B1 | 11/2005 | Olding | |
| 7,202,463 B1 | 4/2007 | Cox | |
| 7,362,355 B1 | 4/2008 | Yang et al. | |
| 7,468,750 B2 | 12/2008 | Mabuchi et al. | |
| 2003/0058346 A1 | 3/2003 | Bechtel et al. | |
| 2004/0239790 A1 | 12/2004 | Maeda et al. | |
| 2006/0215882 A1 | 9/2006 | Ando et al. | |
| 2007/0257998 A1 | 11/2007 | Inoue | |
| 2008/0136953 A1 | 6/2008 | Barnea et al. | |
| 2008/0211940 A1* | 9/2008 | Hynecek ....................... 348/250 |

FOREIGN PATENT DOCUMENTS

| | | |
|---|---|---|
| WO | WO9001844 | 2/1990 |
| WO | WO0024190 | 4/2000 |
| WO | WO0109717 | 2/2001 |

OTHER PUBLICATIONS

Sung-Hyung Yang & kyoung-Rok Cho, High Dynamic Range CMOS Image Sensor with Conditional Reset, IEEE 2002 Custom Integrated Circuits Conf pp. 265-268, Cheongju Chungbuk, Korea.
Patent Cooperation Treaty, Notification of Transmittal of the International Search Report and the Written Opinion of the International Searching Authority, or the Declaration, Dec. 1, 2009, 8 pages.

* cited by examiner

*Primary Examiner* — Darryl J Collins
(74) *Attorney, Agent, or Firm* — Scott P. Ryan

(57) ABSTRACT

The present invention relates to improved imaging devices having high dynamic range and to monitoring and automatic control systems incorporating the improved imaging devices.

53 Claims, 2 Drawing Sheets

IMAGING DEVICE

CROSS REFERENCE TO RELATED APPLICATIONS

This application is related to U.S. Provisional Patent Application Ser. No. 60/900,588, Ser. No. 60/902,728 and Ser. No. 61/008,762; U.S. patent application Ser. No. 11/999,623, filed Dec. 6, 2007, Ser. No. 12/082,215, filed Apr. 9, 2008, Ser. No. 12/150,234, filed Apr. 25, 2008, and Ser. No. 12/157,476, filed Jun. 11, 2008; and Taiwanese Patent Application No. 97103404, filed Jan. 30, 2008. The disclosures of each of the above are incorporated in their entireties herein by reference.

BACKGROUND

Imaging devices, including CMOS and CCD versions, are becoming popular in a number of contexts. The present invention provides an improved imaging device having high dynamic range and various apparatuses incorporating these high dynamic range imaging devices.

DETAIL DESCRIPTION

Figure 1:
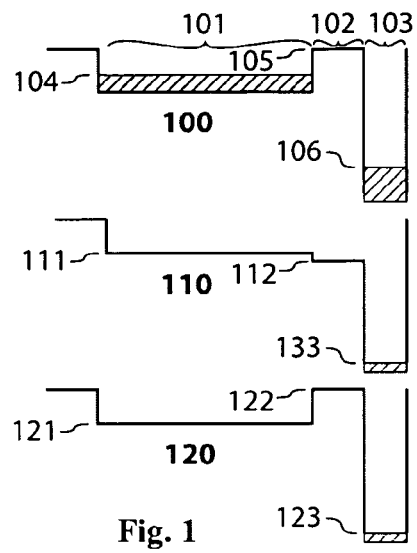
FIGS. 1 through 4 depict potential diagrams for a pixel structure based on a four transistor design.

In the related disclosures incorporated by reference above a high dynamic range imaging device is described. In an implementation of this invention, for each reading, prior to selection of an integration period for each pixel, the pixel is sampled nondestructively at the beginning of successive integration periods. These successive selectable integration time periods are preferably scheduled so that they decrease on an exponential time scale and so that the pixel value is read at the common ending time for the selectable integration periods. A record which gives information on the integration period for each pixel is maintained during acquisition and readout of an image. During acquisition of the image, this record gives an indication of when the pixel is committed to a particular integration period and this input is used in combination with the comparison of the pixel value against a threshold level to select an integration period for the pixel. At the end of the integration period the record gives an indication of the integration period used for the pixel reading. At readout, the combination of the reading of the integrated charge level and of the integration period used for the pixel gives an approximately linear indication of the light level to which the pixel was exposed with consistently high accuracy over an exceptionally wide range of light level and this indication is preferably made independently for each reading of each pixel. Several embodiments have been presented in the related disclosures incorporated by reference above. At least one of the embodiments employs pre-sample integration periods on which to base selection of each of the selectable integration periods. This embodiment may be used with pixel structures which may not be readily sampled non-destructively while an integration is in progress.

A simpler and more straightforward version of the integration period selection for a pixel depends on sampling an indication of the integrated charge level on each pixel not already committed to an integration period at predetermined times until an integration period has been selected for the pixel. When the sampled integrated charge level for a pixel not committed to an integration period exceeds a threshold value, a new and shorter integration period is initiated and, otherwise, the pixel is committed to the integration period already in progress allowing integration to continue until the pixel value is read. An implementation of this version is detailed in the related disclosures incorporated by reference above. The present invention facilitates adaptation of this simpler technique to pixel structures which include a site to accumulate light induced charge during an integration period, a charge transfer mechanism, and a readout node. With these pixel structures, for pixels not yet committed to an integration period, at prescribed times, the charge transfer mechanism for a pixel is set to an intermediate state to cause charge to overflow from the light sensing charge accumulation site to the readout node when the sampled light induced charge in the accumulation site of the pixel exceeds a threshold level and the readout node is then sampled to approximately detect the presence or absence of charge overflow from the pixel charge accumulation site, preferably by making an analog comparison of the voltage change on the readout node due to charge overflow, if any, to a charge overflow detection threshold level. When charge overflow is not detected, the pixel is committed to the integration period in progress and otherwise, the pixel is reset to begin a shorter integration period. For the first case, since little or no charge overflow occurs, the readout is substantially nondestructive, that is, the comparison, in this case, has minimal effect on the pixel integration which is in progress. This is the case for which integration to readout is continued and, thus, for which effects of the comparison which substantially alter the readout value for the integration in progress are a serious detriment. Thus, the compare technique has a minimal effect on the integration in progress under the selective condition when the readout is to be continued. At prescribed intervals prior to beginning the shortest of the available integration periods, a pixel not already committed to an integration period is subjected to further checks similar to the one just described until either charge overflow is not detected and the pixel is committed to the integration period in progress or the pixel is not committed to a longer integration period so the shortest available integration period is initiated. The device in a preferred embodiment provides this series of checks and conditional actions for each active pixel in the image sensing array. The evaluation of readout node levels preferably employs correlated double sampling in a first case for final pixel readout at the end of the selected integration period and also in a second case to detect charge overflow to the pixel readout node for the charge overflow detection operations. In both cases while the transfer gate is in the nonconducting state, the readout node is reset, the reset is preferably released and the potential level at the readout node is sampled just after the reset. Then in the first case for final pixel readout, the control input of the transfer gate is set to the required level to preferably transfer substantially all of the charge from the pixel charge accumulation site to the readout node. The transfer gate is preferably returned to to the blocking state and the readout node is again sampled. The sampled reset level is subtracted from the pixel reading after integrated charge is transferred to the readout node and the value is preferably digitized. In the second case to determine if the accumulated charge on the pixel exceeds a threshold level, the reset level is sampled in a manner similar to that used for the pixel readout operation, then the control input of the transfer gate is set to an intermediate level to transfer accumulated charge which exceeds a threshold level for the pixel. The sampled potential level of the readout node at reset is subtracted from the potential level of the readout node which is sampled after the charge overflow transfer phase of the charge overflow sampling operation. Subtraction of the reference level creates a corrected charge overflow reading which is then preferably compared with a charge overflow detection threshold level to determine if the integrated charge in the pixel charge site exceeded the pixel integrated threshold level. It is preferable to set the charge overflow detection threshold level high enough to minimize false indication of charge overflow while not making the threshold level unnecessarily high. When charge overflow is not detected, the integration period in progress for the pixel is permitted to continue and in some implementations charge which overflows from the pixel charge collection site to the readout node without triggering the charge overflow indication is lost from the charge accumulated at the end of the integration period thereby causing a change in the pixel reading. It is possible and within the scope of this invention to include compensation for this charge loss and the resulting change in the reading but is more straight forward to provide a sensitive charge overflow detection circuit utilizing techniques such as the correlated double sampling as just described to minimize the charge overflow detection error so that a low detection threshold may be used. A low charge overflow detection threshold minimizes accumulated charge which may be lost from a pixel due to undetected charge overflow in the pixel threshold level detection operation thereby minimizing the pixel reading error which may result from this loss of integrated charge during the threshold sampling operation.

A portion of the integration period remains after use of the charge overflow technique to check the pixel level against a threshold. If integration is continued after bleeding a significant amount of charge from the pixel in the charge overflow operation and then continuing integration, the effect is to create a reduced response of the pixel to light during the shorter integration period after the charge threshold detection operation producing a substantially reduced slope in the response of the pixel for output levels above that for which charge bleed off occurs. The intent in a preferred embodiment has been to make the charge overflow detection comparison sensitive enough to minimize this effect preferably reducing its magnitude to the point that it can be neglected. As an option, we may make provision to take the threshold point at which the slope in pixel response changes and the reduced slope of the pixel response above this charge overflow threshold into account in evaluation of the pixel output value and utilize readings which have ranges of response in this area of reduced slope. Taking these effects into account may be most beneficial in application of the imager of this invention where reading accuracy is of particular importance. In such applications, variation from one pixel to another in the threshold at which charge overflow occurs and in the resulting exposure level for which the slope change occurs from one pixel to the next may be one of the more significant sources of error. For such applications, response characteristics for each of the pixels in each of the ranges may be individually recorded or classified and this information may be used to eliminate a portion of the fixed pattern noise which would otherwise remain in compensation for the changes in the slope of the response for various pixels. The charge overflow threshold value is preferably set high enough to reasonably utilize the full scale readout range for a pixel but low enough to avoid an undesirable high number of saturated pixel readings (i.e. to keep these factors in balance).

In versions of the cited prior art device, a pixel output that is directly indicative of the accumulated light induced charge is read from the pixel to perform the threshold sampling operation used in selection of the integration period for the pixel and this operation is performed preferably in parallel on pixels in a row, a row at a time, for all active pixels in the imager. Furthermore, the operation may be performed multiple times on some of the pixels. This technique is readily adaptable to pixel structures such as those based on 3 transistor designs which are amenable to readout while integration is in progress. With pixel structures such as 4 transistor based designs, pixel charge is normally transferred from a charge collection to a readout site during the readout phase and the steps performed are not necessarily reversible. Furthermore, when they are not performed in a proper sequence with proper timing, features such as as the use of correlated double sampling may no longer be available. In the present invention, the threshold comparison operation is moved to the individual pixels by using intermediate settings of the transfer gate control input voltages to establish the level of accumulated charge in the charge collection site of each pixel at which charge will overflow from the charge accumulation site to the readout node. For the invention, as described above and in the related disclosures incorporated by reference above, when charge accumulation of a sampled pixel exceeds a level for which the pixel is already saturated or too likely to saturate before the end of the integration period, a new and shorter integration period is initiated. The preferred way to practice the invention is to momentarily set the voltage of the control input to the transfer gate so that charge will overflow to the readout node if the charge level on the pixel has reached the threshold level just described and so that little or no charge will flow to the readout node if the light induced charge on the pixel is below this threshold level. The readout then indicates charge which has overflowed and not the full range of a full pixel reading, and the charge overflow detection threshold value which is used to determine significant charge overflow from the charge accumulation site in the pixel to the readout node is preferably very much lower than a reading of the full pixel charge would be. As indicated above, correlated double sampling may be used both for final readout of the pixel value and also for the charge overflow detection reading just described. This permits a low noise detection reading and a correspondingly small charge overflow detection threshold to reliably detect charge overflow. As indicated above, integration is continued only if little or no charge is transferred from the charge accumulation site to the readout node in the charge overflow detection operation. Thus, the effect of the test on the final reading is minimal.

Intermediate settings of the control input to the transfer gate have been used in prior art devices to partially reset a pixel to specified levels on a specified schedule during integration to increase the dynamic range by creating breakpoints in the slope of the pixel response to provide a piecewise linear output. In the present design, charge transfer from pixels for which integration continues creates an undesirable rather than a desirable effect and is preferably minimized. Pixels for which reliably detectable charge transfer occurs are preferably reset to begin a new integration period so that charge overflow in this case is not removed from the charge level which is accumulated in the newly initiated integration period. Also note that the occurrence of charge overflow from each pixel is monitored and whether detectable charge overflow occurs or not is used as a primary factor in the selection of the appropriate integration period for each pixel. A further advantage of using the charge overflow primarily for deciding whether or not to use a particular integration period is that consequences of inaccuracies in the pixel accumulated charge level at which charge overflows relate to which integration range is selected and do not directly affect the accuracy of the reading taken using the selected integration range so the effect on readout accuracy is a secondary one. Prior art devices which use charge overflow to shape the response curve require substantially higher accuracy for the pixel output reading to obtain comparable accuracy in the end result and inaccuracies in pixel charge levels at which charge overflows contribute directly to inaccuracies in pixel readout values.

Figure 2:
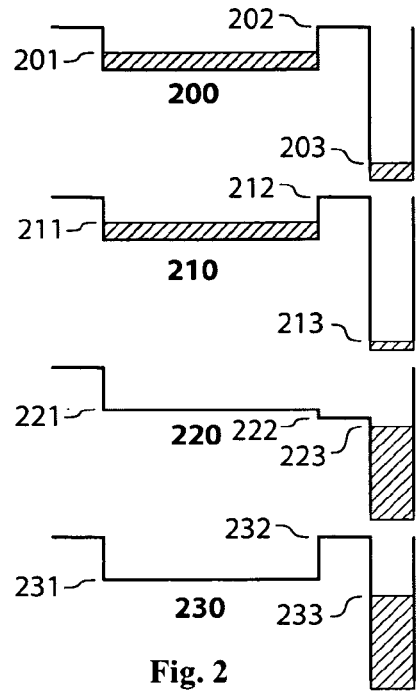
Figure 3:
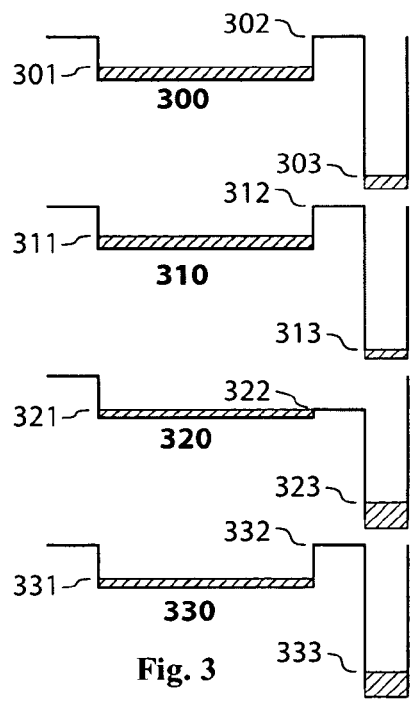
Figure 4:
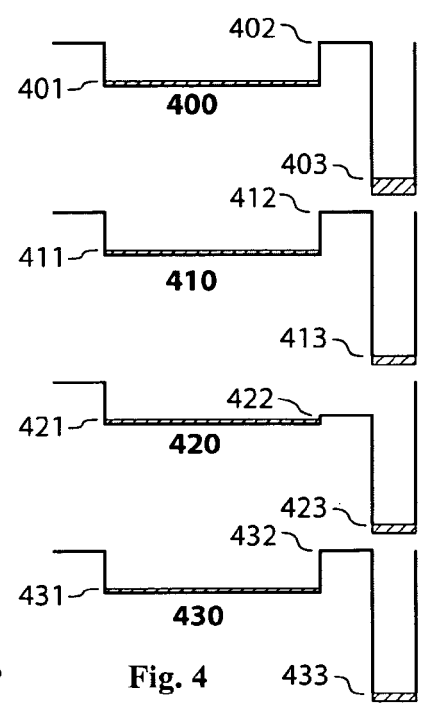

FIGS. 1 through 4 indicate potential diagrams for a pixel structure based on a 4 transistor pixel design which has a pinned photodiode and which may be operated in accordance with this invention. FIG. 1 illustrates a reset sequence to begin integration. FIG. 2 illustrates a normal pixel readout sequence for a pixel. The integrated charge level illustrated in FIG. 2 results in a nominal full scale reading. FIG. 3 illustrates a pixel photodiode charge threshold detection operation which uses a charge overflow threshold setting for the transfer gate and for which charge overflow occurs. FIG. 4 illustrates a pixel photodiode charge threshold level detection operation which uses a charge overflow threshold setting for the transfer gate and for which charge overflow does not occur. In FIG. 1, potential diagram 100 will be used to illustrate features common to all of the potential diagrams in FIGS. 1 through 4. The vertical upward direction in FIG. 100 represents increasing negative potential due to increased electron charge. Area 101 represents a photodiode (a pinned photodiode in the illustrations) and 104 indicates the level of the accumulated light induced charge stored in the photodiode. Area 102 represents a potential barrier created by a transfer gate between the photodiode charge collection and accumulation area 101 and a floating diffusion which forms a readout node 103. The capacitance of the readout node is normally lower than the capacitance of the photodiode so that a voltage amplification effect occurs when charge is transferred from the photodiode 101 to the floating diffusion 103. A pixel design based on a minimal 4 transistor structure with a pinned photodiode is illustrated. Photons are captured and release electrons which add to the charge level 104 accumulated in the photodiode structure. The transfer gate has a control input, not shown, whose voltage controls the height of the potential barrier shown at 102. A lower transfer gate control input voltage raises the height of this barrier and a higher transfer gate control input voltage lowers the height of the barrier. The result of a high transfer gate control input voltage is illustrated at 112 where the transfer gate is turned on to its nominally full conducting state (i.e. the level to create a low potential barrier). The result of an appropriately adjusted intermediate transfer gate control input voltage is illustrated at 322 in FIG. 3 and 422 in FIG. 4 where the transfer gate control input voltage is set to establish the desired potential barrier height to set the pixel photodiode charge threshold level at which charge overflow from the photodiode charge accumulating site to the floating diffusion readout site takes place. The result of the lowest transfer gate control input voltage is illustrated at 105 where the transfer gate is turned off (to its nominally full blocking state i.e. the level to create a high potential barrier). In an imaging application, various optional features such as anti-blooming control may be provided, usually by adding transistors and using the basic 4 transistor pixel structure as a starting point. As an additional option, components such as the readout node may be shared to reduce the per pixel transistor count and such options are considered to be within the scope of this invention. In addition to the control input to the transfer gate, three transistors (not shown) are normally associated with the floating diffusion. These include a reset transistor to drain charge from and reset the floating diffusion to a reset level as indicated at 133 of FIG. 1, a buffer transistor to serve as a voltage follower to buffer the output voltage at the floating diffusion and an output selection transistor to select the buffered pixel output voltage for readout typically on a column readout line in the imaging array.

FIG. 1 outlines a typical pixel reset sequence used at the beginning of an integration period. Diagram 100 depicts a typical state at the beginning of the reset operation where charge level 104 in the charge storage area of the photodiode and charge level 106 in the readout node 103 may be in indeterminate states. In diagram 110, the control input to the transfer gate is momentarily set high to lower the transfer gate potential barrier 112 so that charge empties from the photodiode to the floating diffusion readout node leaving the photodiode empty as indicated at 111 and the reset transistor is turned on to drain charge from the readout node as indicated at 133. Then, in diagram 120 the transfer gate is returned to its blocking state as indicated at 122 to permit integration to begin.

In FIG. 2, at the end of an integration period initiated as indicated in FIG. 1, a typical state is indicated in diagram 200. The readout node (floating diffusion) is first reset by momentarily turning on the reset transistor and then turning it back off thereby resetting the floating diffusion level from the level 203 to the level 213 in diagram 210. The level 213 is buffered by a transistor in the pixel as indicated above and the buffered level is connected to the column readout line and sampled. Next in diagram 220, the transfer gate control signal is switched to its high state to lower the potential barrier and drain charge from the photodiode charge storage site to the floating diffusion as indicated by the depleted charge level 221 in the photodiode and the increased level 223 in the floating diffusion readout node. In diagram 230, the transfer gate has been returned to the blocking state as indicated at 232 and the readout level 233 is buffered, connected to the readout line and sampled in a manner similar to the readout of the reference voltage 213. For pixel readout, the sampled reference reading of level 213 is normally subtracted from sampled pixel readout value 233 and after optional amplification, the value is normally digitized. Reset of the readout node and sampling of the reference value at 213 followed by addition of the light induced charge from the photodiode to the readout node followed by sampling of the integrated charge level and subtraction of the sampled reference level constitutes correlated double sampling which cancels the otherwise significant reset noise level present after the floating diffusion is reset.

Figure 5:
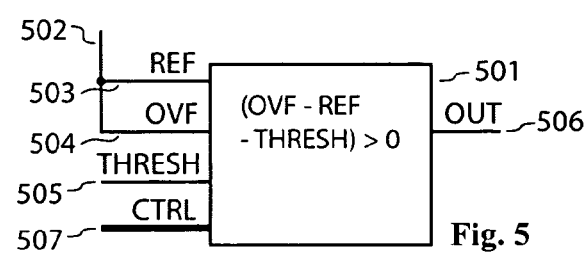
FIG. 5 depicts a pixel charge overflow threshold detection compare circuit.

In FIG. 3, at a predetermined time after an integration period is initiated as indicated in FIG. 1, a typical state is indicated in diagram 300. The intent of the sequence of operations performed on the pixel as illustrated in FIG. 3 is to compare the level of light induced charge stored in the pixel against a threshold level in a way that causes a small and preferably minimal change in the amount of charge stored on the pixel when the amount of charge stored in the pixel is below the threshold level. The readout node (floating diffusion) is first reset by momentarily turning on the reset transistor and then turning it back off thereby resetting the floating diffusion level from the level 303 to the level 313 in diagram 310. The level 313 is buffered by a transistor in the pixel as indicated above and is connected to the column readout line and sampled by a charge overflow threshold compare circuit as depicted in FIG. 5. Next in diagram 320, the transfer gate control signal is switched to an intermediate state to lower the potential barrier to the photodiode charge overflow detection threshold and drain charge which exceeds the overflow threshold from the photodiode charge storage site to the floating diffusion. In this case the charge level 311 in the charge storage site in the light sensing photodiode exceeds the overflow detection threshold 322 so charge whose negative potential exceeds the threshold comparison level set at 322 flows from the charge storage site in the photodiode to the floating diffusion readout node. This flow of charge results in the reduced charge level 321 in the photodiode negative charge potential and the increased level 323 in the floating diffusion readout node. In diagram 330, the transfer gate has been returned to the blocking state as indicated at 332 and the readout level 333 is buffered, connected to the readout line and sampled in a manner similar to the readout of the reference voltage 213. For detection of charge overflow, the sampled reference reading of level 313 is subtracted from the sampled charge overflow reading of level 333. The value is preferably not digitized but compared directly against a charge overflow detection threshold. The charge detection threshold is preferably set just high enough to reliably determine whether or not a detectable amount of charge has overflowed the potential barrier 322 created by the intermediated transfer gate setting to flow from the pixel charge storage site the floating diffusion readout node. Reset of the readout node and sampling of the reset reference value at 313 followed by addition of the charge which may overflow from the photodiode to the reference node followed by a second sampling of the readout made after the charge overflow sampling operation and subtraction of the reference level constitutes correlated double sampling which cancels the otherwise significant reset noise level present after the floating diffusion is reset. For the example of FIG. 3, significant charge overflow does occur so detectable overflow condition is asserted as a result of this comparison. In the application of this overflow comparison circuit in the invention, this will normally lead to reset of the pixel to begin a new and shorter integration period and the memory associated with the pixel is set to reflect the update.

In FIG. 4, at a predetermined time after an integration period is initiated as indicated in FIG. 1, a typical state is indicated in diagram 400. The intent of the sequence of operations performed on the pixel as illustrated in FIG. 4 is to compare the level of light induced charge stored in the pixel against a threshold level in a way that causes a small and preferably minimal change in the amount of charge stored on the pixel when the amount of charge stored in the pixel is below the threshold level. The readout node (floating diffusion) is first reset by momentarily turning on the reset transistor and then turning it back off thereby resetting the floating diffusion level from the level 403 to the level 413 in diagram 410. The level 413 is buffered by a transistor in the pixel as indicated above and is connected to the column readout line and sampled by a charge overflow threshold compare circuit as depicted in FIG. 5. Next in diagram 420, the transfer gate control signal is switched to an intermediate state to lower the potential barrier to the photodiode charge overflow detection threshold and drain charge which exceeds the overflow threshold from the photodiode charge storage site to the floating diffusion. In this case the charge level 411 in the charge storage site in the light sensing photodiode is below the overflow detection level 422 so charge level 421 in the photodiode remains substantially the same as the level 411 and since little or no charge is transferred to the readout node, the level 423 in the floating diffusion readout node remains substantially the same as the level 403. In diagram 430, the transfer gate has been returned to the blocking state as indicated at 432 and the readout level 433 which is substantially unchanged from the level 403 is buffered, connected to the readout line and sampled in a manner similar to the readout of the reference voltage 413. For detection of charge overflow, the sampled reference reading of level 413 is subtracted from the sampled charge overflow reading of level 433 made after sampling for possible charge overflow. The value is preferably not digitized but compared directly against a charge overflow detection threshold to determine whether or not a reliably detectable amount of charge has overflowed the potential barrier 422 created by the intermediated transfer gate setting to flow from the pixel charge storage site the floating diffusion readout node. Reset of the readout node and sampling of the reset reference value at 413 followed by addition of the light induced charge from the photodiode to the reference node followed by sampling of the integrated charge overflow and subtraction of the reference level constitutes correlated double sampling which cancels the otherwise significant reset noise level present after the floating diffusion is reset. For the example of FIG. 4, no significant charge overflow occurs so detectable overflow condition is not asserted as a result of this comparison. In the application of this overflow comparison circuit in the invention, this will normally lead to a commitment to the integration in progress and the memory indication associated with the pixel is left or altered depending on the setting algorithm to indicate that the integration period in progress is committed for readout and also to indicate what integration period is being used for the pixel. In preferred implementations, when a pixel is committed to an integration period, further checks to detect overflow for the pixel are suspended until the integration to which the pixel is committed is completed and the pixel value is read.

The block diagram of FIG. 5 depicts the pixel charge overflow threshold detection compare circuit. In a preferred embodiment, one of these overflow detection circuits is associated with each of the column readout lines 502 in the imaging array. As indicated in the descriptions associated with FIGS. 3 and 4, the reference voltage 503 and overflow detection voltage 504 are each asserted on the column readout line 502 but at different times. The circuit of FIG. 5 preferably incorporates an array of logic, of capacitive storage elements, analog switches, logic, an analog amplifier and a digital latch to latch the compare result on output line 506. An overflow detection threshold voltage, preferably in analog form, is input at 505 and control inputs 507 are provided. These signals are preferably provided to all or a number of the overflow detection circuits associated with respective column readout lines and preferably provided to provide parallelized operations for the integration period selection operations. The overflow detection circuit 501 is configured to respond to the series of signal, threshold and control inputs and output a signal which is preferably latched so that it remains stable for a specified period of time. The output 506 is preferably asserted when the sampled overflow reading minus the reference reading exceeds the overflow detection threshold voltage input at 505.

Figure 6:
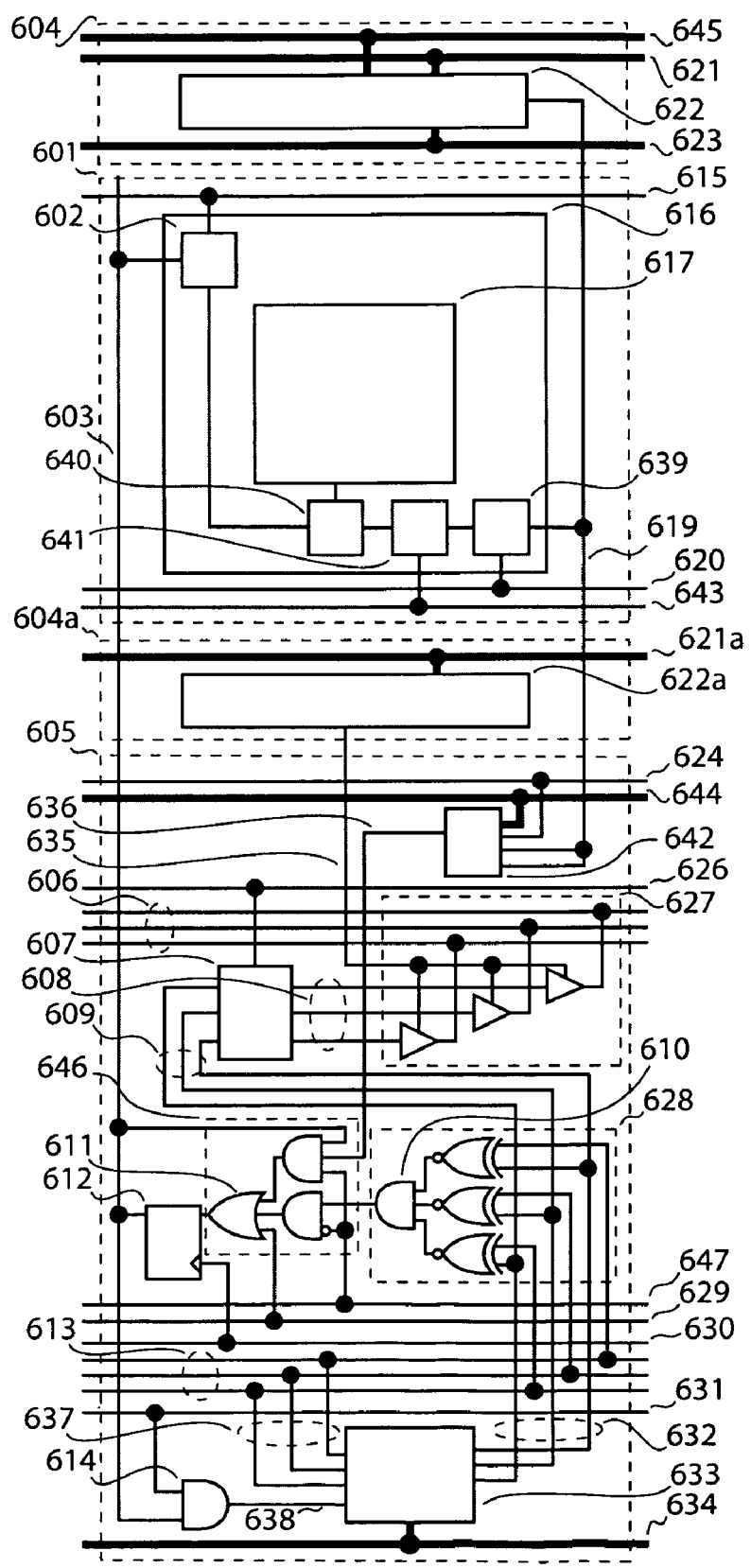
FIG. 6 depicts a simplified diagram of a circuit associated with one column of pixels in an array of pixels.

FIG. 6 depicts a simplified diagram of the circuit associated with one column of pixels in an imaging array. In the diagram in FIG. 6, one pixel of the column is depicted as pixel 616 within block 601. This pixel is from one representative row. A typical device constructed according to this invention may include many hundreds of rows of pixels and one pixel per row is preferably included in the column of pixels constructed in accordance with the diagram of FIG. 6. There are no explicit limitations on the size of the imaging array which may be implemented according to this invention. Arrays of 450 and more rows and 750 and more columns are readily accommodated. As with other imagers, tradeoffs with frame rate, readout techniques used and the like may be needed to maintain good performance as the array size is increased. The imager pixel array is preferably restricted to rows which are actually read with the optional addition of some guard rows and possible rows and columns of dark reference pixels which are shielded from light around the periphery of the active imaging area. Column integration selection logic circuits need to be implemented only for columns which are read. The integration period selection logic circuit associated with the column is preferably replicated for each column having active pixels so that actions to select an integration period for a pixel may be performed substantially in parallel for each active pixel in a selected row.

The row transfer gate enable and control line 615 (one per each row of pixels), the row readout enable line 620 (one per each row of pixels), the floating diffusion reset line 643 (one per each row of pixels), the column address bus 621 (and optional duplicate column address bus 621*a* on the opposite side of the imaging pixel array), the readout control bus 645, the pixel readout bus 623, the pixel charge overflow detection threshold signal 624, the control signals 644 for the overflow threshold detection compare circuit 642, the row buffer memory write enable 626, the integration time output bus 606, the unconditional pixel transfer gate enable 629, the charge overflow sample enable 647, the transfer gate enable flip-flop clock 630, the integration period tag bus 613, the tag memory update enable 631, and the row address bus 634 are preferably routed to and shared by corresponding circuits for each of the active columns. The column transfer gate operation enable line 603 and the column readout line 619 are preferably shared by each of the active pixels in the column. Representative pixel 601 is selected by asserting a select signal on row select line 620. Assertion of the row select signal on 620 enables transistor circuit 639 which drives column readout line 619 to a voltage level which indicates the level of charge in the floating diffusion which is part of block 641 which includes the floating diffusion readout node and a reset transistor. The reset transistor is operated to reset the floating diffusion and also resets the pixel charge collection area 617 when the transfer gate 640 is switched to its conducting (low blocking potential) state. The circuit 602 responds to simultaneous assertion of the row transfer gate enable and threshold control line 615 and the column transfer gate enable line 603 to switch transfer gate 640 from its full blocking state to a reduced blocking potential. Preferably, the level asserted on row transfer gate enable line 615 is used to adjust the blocking potential of the transfer gate when it is asserted. The intermediate blocking potential is preferably set and used to perform the comparison of the charge level stored in the pixel against a threshold level using the intermediate transfer gate setting to establish the comparison threshold and using charge overflow detection circuits to detect the result of the comparison. Block 604, shown in simplified form, contains circuit 622 which includes column sampling capacitors and a column select circuit to respond to signals on column select address bus 621 and control bus 645 and to sample signals on column readout line 619 in response to control signals on control bus 645 and to gate the sampled pixel readout signals to readout bus 623 in response to assertion of the matching column select address along with appropriate control signals on bus 645. Block 622*a* is a column select circuit which responds to the column address input from bus 621*a*. The functionality of bus 621*a* and column select circuit 622*a* may partially duplicate functionality provided by bus 621 and readout circuit 622, the intent of this duplication being to provide added physical and electrical isolation between the pixel readout circuits and the pixel integration period selection circuits while providing synchronization between readout of the pixel values with readout of the indication of the integration period used for the pixel reading. In a preferred arrangement, the pixel readout circuits are placed on an opposing side of the pixel array relative to the integration period selection circuits. One of the primary advantages of this layout is that the column transfer gate enable lines may end at, or near, the edge of the pixel array and do not need to extend into the area which contains the pixel column sampling circuits for the readout. Even the column readout lines may not have to extend through the area which contains the readout sampling capacitors. A signal is asserted on select line 635 when the column is selected by the column address asserted on bus 621 and also on bus 621*a*. Select signal 635 output by column select logic 622*a* is used to gate the memory record which indicates the integration period used to read the selected pixel to bus 606 in synchronization with readout of the analog pixel value which is derived from signals and analog values gated to bus 623.

Charge overflow detection threshold compare circuit 642 compares the change in the signal level on column readout line 619 which is indicative of the light induced charge which overflows from the charge collection site to the readout node in the selected pixel against a charge overflow detection threshold reference level input on line 624. A logic true signal is asserted on output 636 when the signal 619 exceeds the charge overflow detection threshold indicating significant charge overflow from pixel photodiode 617 to floating diffusion 641. The overflow threshold of transfer gate 640 is preferably established by the voltage level asserted on row transfer gate enable and threshold control signal 615.

Bus 613 is used to communicate the numerical integration period identifying memory tag for the integration periods. This numerical memory tag may be encoded in a number of ways. In the exemplary design, the longest through the shortest integration periods are assigned identifying numerical memory tags of 0 through 7, respectively. In a preferred embodiment, a pixel is reset unconditionally for the longest integration period in a reading sequence and for successive shorter integration periods in the sequence, the pixel is reset if and only if the compare output 636 is asserted for the pixel indicating that the light induced integrated charge on the pixel exceeds the threshold value and the pixel has also been reset for every previous longer integration period in the reading sequence. The memory tag for the pixel is set to indicate the new integration period initiated for the pixel. To suspend further resets of the pixel once a reset of the pixel is missed, it is sufficient to check the integration period identifying memory tag entry for the pixel to see if the pixel was reset for the immediately preceding integration period. If not, the current reset is inhibited for the pixel regardless of the state of the charge overflow detection output 636. This is a preferred mode of operation. If the tag for the pixel indicates that it was reset for the immediately preceding integration period and the integrated charge on the pixel exceeds the threshold value as indicated by charge overflow detection output 636, the pixel is reset and the integration period identifying memory tag for the pixel integration period is updated to identify the integration period established by this reset of the pixel. The memory block 633 preferably has an entry for each pixel of the column, the current pixel being selected for read and write tasks by the row address of the selected row which is communicated on bus 634 and serves as the address input to memory block 633. The compare circuits 628 performs a bit by bit matching comparison of the integration period identifying numerical tag saved for the pixel against the tag value asserted on bus 613. The "and" gate 610 asserts a true output when and only when all three of the bitwise match comparisons match indicating that the memory tag value for the pixel matches the tag value broadcast on bus 613. "D" type flip-flop 612 registers the column transfer gate enable signal 603 when it is clocked by a clock signal on line 630. Logic circuit 646 controls the "D" input to the flop-flop and enables unconditional setting of the column transfer gate enable flip-flop 612 when line 629 is asserted. This is used to enable all of the transfer gates in the row to perform an unconditional row reset operation and also as part of the sequence to perform a row read operation. When the charge overflow sample enable 647 and the unconditional enable 629 are both de-asserted, the column transfer gate enable flip-flop 612 is set when the tag output from the memory associated with the selected pixel matches the tag input on tag bus 613. This is used to set transfer gate enable flip-flop 612 during a conditional reset operation when the pixel was reset for the immediately preceding reset operation. This is the first of the two uses of the column reset enable line in the conditional reset operation. For this use, flip-flop 612 is set to operate the transfer gate to selectively switch the intermediate voltage which is preferably set on column transfer gate enable and threshold control line 615 to establish the threshold for the charge overflow based pixel threshold level comparison. The threshold value may optionally be set individually for each of the conditional selection operations for the different selectable integration periods. In alternate configurations, control of the transfer gate blocking potential threshold may be introduced in alternate ways such as by control of the voltage asserted on the column transfer gate enable line 603 as a function of the desired transfer gate blocking potential. When unselected, the potential on row transfer gate enable line 615 should be one which results in a large blocking potential for transfer gates in pixels in the row which are also selected by the column transfer gate enable lines. When selecting pixels in a row for reset, the potential on row transfer gate enable line 615 should be one which results in a minimum blocking potential for transfer gates in pixels in the row which are also selected by the column transfer gate enable lines. Preferably, during a conditional reset interval for a row of pixels, clock 630 is asserted a second time to set the pixel transfer gate column enable flip-flop 612 conditionally to enable reset of pixels for which charge overflow has been detected in the threshold comparison test. For this setting, prior to clocking the flip-flop 612, unconditional flip-flop setting enable line 629 is de-asserted, and pixel threshold test overflow enable line 647 is asserted and the control sequence on bus 644 is performed in conjunction with other control signal settings to set overflow detection line 636 to indicate the presence or absence of charge overflow detection for the pixel. When the charge overflow condition is asserted on line 636 and when flip-flop 612 is also set indicating that the charge overflow pixel charge level test was performed for the pixel, logic block 646 asserts the "D" input of flip-flop 612 so that it is set in response to a clock signal on 630 and transfer gate enable line 603 is asserted to set the transfer gate 640 to its lowest blocking potential during the reset sequence to drain charge from photodiode 617 bringing it to its reset state.

Memory update enable line 631 is asserted to update the integration period identifying tag for the pixel being processed in memory 633. The update is performed to the memory location selected by the row address asserted on address bus 634 when the memory update line 631 is asserted, and the pixel is reset as indicated by assertion of column transfer gate enable line 603. The output 638 of "and" gate 614 which ands the update line 631 and the pixel column transfer gate enable line 603 serves as the write enable to memory block 633. When write enable 638 is asserted, the numerical integration period identifying memory tag value for the integration period which is communicated on bus 613 is written into the entry for the pixel in memory block 633. In the conditional reset tasks, bus 613 is used to communicate two separate integration period identifying tags, each at a separate time interval within the sequence. Toward the beginning of the sequence, the tag for the immediately preceding integration period is communicated on bus 613 for use by compare circuit 628. Toward the end of the sequence, the tag value for the current integration period is communicated on bus 613 to update the memory indication as just described for pixels which are reset to initiate a new and shorter integration period.

The preceding discussion has focused mainly on column related conditional and unconditional reset tasks for the pixel in the selected row of the associated column. At the end of the integration period established by the sequence of reset tasks, the pixels of the row are read. The row read task is accomplished in two phases. The first of which is preferably a row parallel task which is preferably performed during a column count range which does not overlap the column count ranges used for any of the reset tasks. The second phase is preferably a pixel by pixel or a small pixel group by small pixel group processing stage and is preferably configured so that it does not require access to row select, row readout, column readout, or column reset lines needed for the ongoing reset tasks. Then the pixel processing in the second phase may overlap ongoing reset tasks and may optionally be performed using any one of a number of organizational approaches. For example, processing may be a pixel by pixel operation or, perhaps, a sequential operation using pipelining or parallel processing on small subgroups of the pixels in the row. For the first, preferably parallel stage of the operation, the readout select line 620 is asserted for the row of pixels being processed gating the pixel value to column readout line 619. A readout sequence which may be very similar to that used in prior art imagers is performed whereby the pixel value asserted on column line 619 is sampled by capacitors or other circuitry in pixel readout processing block 622. The sequence preferably includes reset and sampling of the floating diffusion prior to transfer of charge from pixel charge storage site 617 to provide correlated double sampling as part of the readout sequence. In the preferred embodiment, the row address of the row being read is asserted on address bus 634 so that the integration period identifying tag for the pixel being read is presented on output lines 632 of memory block 633. As part of the row readout sequence, write enable line 626 is asserted to store the integration period identifying tag for the pixel being read in tag buffer memory 607. The task is preferably performed in parallel for all active pixels of the row so the integration period of each pixel of the row is available in the associated buffer memory 607 of the replicated column logic blocks.

In the exemplary embodiment, for the second phase of the readout sequence, the column address is communicated to pixel readout 622 on column address bus 621. This sequentially incremented column address is decoded in block 622 and serves to sequentially select column sampling capacitors for analog to digital conversion of the sampled pixel value and processing of the pixel and also to gate the integration period used for the pixel on bus 606. The final readout value for the pixel is adjusted to indicate the proper light level reading given the integration period used to acquire the reading. The record of the integration period which was used for the pixel reading is buffered in memory block 607. The column address decode logic in block 622a asserts output line 635 when the column is selected to enable bus drivers 627 to gate the integration period identifying tag stored in memory 607 onto bus 606. The integration period output on bus 606 is preferably combined with a preferably digitized reading of the charge level on the pixel to provide an indication of the light level to which the pixel was exposed over an exceptionally wide dynamic range and this indication after optional further processing is preferably provided as an output from the imaging device.

It should be understood that the above detail description is provided for enabling one of ordinary skill in the art to make and use the invention as recited in the appending claims. In know way should this description be interpreted as limiting the scope of the invention to any given embodiment, therefore, the appending claims are intended to include all equivalent structure and equivalent function within the respective scope.

What is claimed is:

1. An imaging device, comprising:
   an array of pixels, wherein each pixel of said array of pixels is independently controlled to select one of a plurality of integration periods of a frame period based upon a charge overflow detection reading; and
   at least one charge overflow detection circuit configured to dynamically determine said integration period for at least one said pixel, wherein said charge overflow detection reading of at least one said pixel comprises a correlated double sampling.

2. An imaging device as in claim 1 further comprising compensation for charge loss.

3. An imaging device as in claim 1 further comprising correlated double sampling for final readout of a pixel value.

4. An imaging device as in claim 1 wherein the charge overflow detection reading is compared against an overflow detection threshold.

5. An imaging device as in claim 1 wherein an overflow detection threshold is set to balance reliable overflow detection against unnecessarily high loss of charge from the pixel at the detection threshold.

6. An imaging device as in claim 1 further comprising a 4 transistor based pixel design comprising a pinned photodiode.

7. An imaging device as in claim 1 further comprising a transfer gate between a photodiode charge collection accumulation area and a floating diffusion.

8. An imaging device as in claim 7 wherein minimal charge is lost from said photodiode when charge overflow is not detected.

9. An imaging device as in claim 8 wherein an integration period is selected at least partially in response to non-detection of charge overflow for said pixel.

10. An imaging device as in claim 7 said transfer gate comprising a control input.

11. An imaging device as in claim 10 wherein said control input is set to establish a threshold potential at which charge overflow occurs.

12. An imaging device in claim 11 wherein charge overflow is from said photodiode to said floating diffusion.

13. An imaging device as in claim 11 wherein the charge overflow threshold potential is set to balance under utilization of a pixel full scale range against overly high occurrence of pixel value saturation at readout.

14. An imaging device as in claim 1 wherein a new integration period is initiated for said pixel at least partially in response to detection of charge overflow for said pixel.

15. An imaging device as in claim 1 wherein an integration period in progress for a pixel is continued at least partially in response to non-detection of charge overflow for said pixel.

16. An imaging device as in claim 1 further comprising anti-blooming control.

17. An imaging device as in claim 1 further comprising a shared readout node configured to reduce a per pixel transistor count.

18. An imaging device as in claim 1 wherein said overflow detection circuit is associated with a corresponding column readout line.

19. An imaging device as in claim 1 comprising 450 and more rows and 750 and more columns.

20. An imaging device as in claim 1 further comprising a row transfer gate enable and control line.

21. An imaging device as in claim 1 formed on a silicon substrate, wherein pixel readout circuits are placed on an opposing side of said array of pixels relative to integration period selection circuits.

22. An imaging device, comprising:
   an array of pixels formed on a silicon substrate, wherein each pixel of said array of pixels is independently controlled to select one of a plurality of integration periods of a frame period based upon a charge overflow detection reading;
   pixel readout circuits that are placed on an opposing side of said array of pixels relative to integration period selection circuits,
   wherein at least one of said pixel, said pixel readout circuit, and said integration period selection circuit comprise a charge overflow detection circuit configured to dynamically determine said integration period for at least one said pixel, wherein said charge overflow detection reading of at least one said pixel comprises a correlated double sampling.

23. An imaging device as in claim 22 further comprising compensation for charge loss.

24. An imaging device as in claim 22 further comprising correlated double sampling for final readout of a pixel value.

25. An imaging device as in claim 22 further comprising a 4 transistor based pixel design comprising a pinned photodiode.

26. An imaging device as in claim 22 further comprising a transfer gate between a photodiode charge collection accumulation area and a floating diffusion.

27. An imaging device as in claim 22 further comprising a transfer gate comprising a control input.

28. An imaging device as in claim 22 further comprising anti-blooming control.

29. An imaging device as in claim 22 further comprising a shared readout node configured to reduce a per pixel transistor count.

30. An imaging device as in claim 22 comprising 450 and more rows and 750 and more columns.

31. An imaging device as in claim 22 further comprising a row transfer gate enable and control line.

32. An imaging device as in claim 22 further comprising overflow detection circuit configured to dynamically determine an integration period for at least one pixel.

33. An imaging device as in claim 32 wherein said overflow detection circuit is associated with a corresponding column readout line.

34. An imaging device, comprising:
   an array of pixels, wherein each pixel of said array of pixels is based on a 4 transistor pixel design, and is independently controlled to select one of a plurality of integration periods of a frame period based upon a change overflow detection reading, said 4 transistor pixel design comprising:
a pinned photodiode; and
at least one charge overflow detection circuit configured to dynamically determine said integration period for at least one said pixel, wherein said charge overflow detection reading of said at least one pixel comprises correlated double sampling.

35. An imaging device as in claim 34 further comprising compensation for charge loss.

36. An imaging device as in claim 34 further comprising correlated double sampling for final readout of a pixel value.

37. An imaging device as in claim 34 further comprising a transfer gate between a photodiode charge collection accumulation area and a floating diffusion.

38. An imaging device as in claim 34 further comprising a transfer gate comprising a control input.

39. An imaging device as in claim 34 further comprising anti-blooming control.

40. An imaging device as in claim 34 further comprising a shared readout node configured to reduce a per pixel transistor count.

41. An imaging device as in claim 34 wherein said overflow detection circuit is associated with a corresponding column readout line.

42. An imaging device as in claim 34 comprising 450 and more rows and 750 and more columns.

43. An imaging device as in claim 34 further comprising a row transfer gate enable and control line.

44. An imaging device as in claim 34 formed on a silicon substrate, wherein pixel readout circuits are placed on an opposing side of said array of pixels relative to integration period selection circuits.

45. An imaging device comprising:
an array of pixels, wherein each pixel of said array of pixels is independently controlled to select one of a plurality of successive integration periods of a frame period based upon a change overflow detection reading; and
at least one charge overflow detection configured to dynamically determine said successive integration period for at least one said pixel, wherein said pixel is sampled nondestructively at a beginning of each said successive integration period.

46. An imaging device as in claim 45 further comprising correlated double sampling for final readout of a pixel value.

47. An imaging device as in claim 45 further comprising a 4 transistor based pixel design comprising a pinned photodiode.

48. An imaging device as in claim 45 further comprising a transfer gate between a photodiode charge collection accumulation area and a floating diffusion.

49. An imaging device as in claim 45 wherein a new integration period is initiated for said pixel at least partially in response to detection of charge overflow for said pixel.

50. An imaging device as in claim 45 wherein an integration period in progress for a pixel is continued at least partially in response to non-detection of charge overflow for said pixel.

51. An imaging device as in claim 45 further comprising anti-blooming control.

52. An imaging device as in claim 45 further comprising a shared readout node configured to reduce a per pixel transistor count.

53. An imaging device as in claim 45 wherein said overflow detection circuit is associated with a corresponding column readout line.

* * * * *

UNITED STATES PATENT AND TRADEMARK OFFICE
CERTIFICATE OF CORRECTION

PATENT NO. : 8,144,223 B2
APPLICATION NO. : 12/361025
DATED : March 27, 2012
INVENTOR(S) : Daniel Van Blerkom et al.

It is certified that error appears in the above-identified patent and that said Letters Patent is hereby corrected as shown below:

Column 2
Line 60, "returned to to the" should be --returned to the--.

Column 3
Line 22, "straight forward" should be --straightforward--.

Column 4
Line 16, "such as as the" should be --such as the--.

Column 7
Lines 19-24, "The charge detection threshold is preferably set just high enough to reliably determine whether or not a detectable amount of charge has overflowed the potential barrier 322 created by the intermediated transfer gate setting to flow from the pixel charge storage site the floating diffusion readout node." should be --The charge detection threshold is preferably set just high enough to reliably determine whether or not a detectable amount of charge has overflowed the potential barrier 322, which is created by the intermediated transfer gate setting, to flow from the pixel charge storage site to the floating diffusion readout node.--.

Column 8
Lines 10-11, "site the" should be --site to the--.

Column 11
Line 6, "flop-flop" should be --flip-flop--.

Column 13
Line 13, "know" should be --no--.
Claim 12, line 59, "device in" should be --device as in--.

Signed and Sealed this
Sixth Day of November, 2012

David J. Kappos
*Director of the United States Patent and Trademark Office*

CERTIFICATE OF CORRECTION (continued)
U.S. Pat. No. 8,144,223 B2

<u>Column 14</u>
Claim 22, line 31, "comprise" should be --comprises--.

<u>Column 15</u>
Claim 34, line 1, "change overflow" should be --charge overflow--.

<u>Column 16</u>
Claim 45, line 5, "change overflow" should be --charge overflow--.